US012623288B2

(12) United States Patent
Farahmand et al.

(10) Patent No.: US 12,623,288 B2
(45) Date of Patent: May 12, 2026

(54) PREDICTIVE DEFECT MODEL FOR HIGHLY PRODUCTIVE LASER POWDER BED FUSION ADDITIVE MANUFACTURING

(71) Applicant: Raytheon Technologies Corporation, Farmington, CT (US)

(72) Inventors: Parisa Farahmand, Los Gatos, CA (US); Masoud Anahid, Galena, OH (US)

(73) Assignee: RTX Corporation, Farmington, CT (US)

( * ) Notice: Subject to any disclaimer, the term of this patent is extended or adjusted under 35 U.S.C. 154(b) by 358 days.

(21) Appl. No.: 18/323,875

(22) Filed: May 25, 2023

(65) Prior Publication Data

US 2024/0390984 A1    Nov. 28, 2024

(51) Int. Cl.
| | |
|---|---|
| *B33Y 50/02* | (2015.01) |
| *B22F 10/28* | (2021.01) |
| *B22F 10/366* | (2021.01) |
| *B22F 10/85* | (2021.01) |
| *B33Y 10/00* | (2015.01) |
| *B33Y 30/00* | (2015.01) |

(52) U.S. Cl.
CPC .............. *B22F 10/85* (2021.01); *B22F 10/28* (2021.01); *B22F 10/366* (2021.01); *B33Y 10/00* (2014.12); *B33Y 30/00* (2014.12); *B33Y 50/02* (2014.12)

(58) Field of Classification Search
CPC ..................................................... B33Y 50/02
See application file for complete search history.

(56) References Cited

U.S. PATENT DOCUMENTS

| | | | |
|---|---|---|---|
| 10,252,508 B2 | 4/2019 | Burlatsky et al. | |
| 10,252,509 B2 | 4/2019 | Burlatsky et al. | |
| 10,252,510 B2 | 4/2019 | Burlatsky et al. | |

(Continued)

FOREIGN PATENT DOCUMENTS

| | | | | |
|---|---|---|---|---|
| CN | 118376545 A | * | 7/2024 | ............ G01M 10/00 |
| EP | 3646968 A1 | | 5/2020 | |
| WO | WO-2020150829 A1 | * | 7/2022 | ............ G01P 15/038 |

OTHER PUBLICATIONS

Extended European Search Report for EP Application No. 24177746. 5, Dated Feb. 6, 2025, pp. 9.

(Continued)

*Primary Examiner* — Suresh Suryawanshi
(74) *Attorney, Agent, or Firm* — Kinney & Lange, P.A.

(57) ABSTRACT

This disclosure is directed to a method for modeling additive manufacturing of a part, including a number of steps. The steps include constructing a model for estimating output of a simulated additive manufacturing process, followed by entering process operating parameters for an additive manufacturing system into the model to produce an output. The output is compared to acceptance criteria to determine whether the output is acceptable or unacceptable. Next regions of operating parameters that support production of the part with acceptable quality characteristics are determined based upon the output. Regions of operating parameters that support production of the part with acceptable quality characteristics are added to a process map for additive manufacturing the part. The steps are repeated for different operating parameters until the process map is complete.

20 Claims, 8 Drawing Sheets

(56) References Cited

U.S. PATENT DOCUMENTS

| | | | |
|---|---|---|---|
| 10,252,511 B2 | 4/2019 | Burlatsky et al. | |
| 10,252,512 B2 | 4/2019 | Burlatsky et al. | |
| 10,254,730 B2 | 4/2019 | Burlatsky et al. | |
| 10,525,629 B2 | 1/2020 | Zhang et al. | |
| 10,994,337 B2 | 5/2021 | Khairallah et al. | |
| 11,009,863 B2 | 5/2021 | Bharadwaj et al. | |
| 11,138,352 B2 | 10/2021 | Chen et al. | |
| 11,531,920 B2 | 12/2022 | Anahid et al. | |
| 2016/0221262 A1 | 8/2016 | Das et al. | |
| 2018/0356778 A1 | 12/2018 | Acharya et al. | |
| 2020/0024394 A1* | 1/2020 | Hanson | C08K 3/11 |
| 2021/0026323 A1 | 1/2021 | Chen et al. | |
| 2022/0062997 A1 | 3/2022 | Liu et al. | |
| 2024/0198587 A1* | 6/2024 | Xia | B29C 64/223 |
| 2024/0416423 A1* | 12/2024 | Remacha Corbalan | B33Y 30/00 |

OTHER PUBLICATIONS

Gordon Jerard V. et al: "Defect structure process maps for laser powder bed fusion additive manufacturing", Additive Manufacturing, vol. 36, Aug. 24, 2020 (Aug. 24, 2020), p. 101552, XP093188059, NL ISSN: 2214-8604, DOI: 10.1016/j.addma.2020.101552.

Jincheng Wang: "Understanding melt pool characteristics in laser powder bed fusion: An overview of single- and multi-track melt pools for process optimization", Advanced Powder Materials, vol. 2, No. 4, May 1, 2023 (May 1, 2023), p. 100137, XP093166216, ISSN: 2772-834X, DOI: 10.1016/j.apmate.2023.100137.

Liu Jinge et al: "Metal vaporization and its influence during laser powder bed fusion process", Materials & Design, Elsevier, Amsterdam, NL, vol. 215, Mar. 1, 2022 (Mar. 1, 2022), XP087006824, ISSN: 0264-1275, DOI: 10.1016/J.MATDES.2022.110505 [retrieved on Mar. 3, 2022].

* cited by examiner

Constant Radius

Perturbations grow

Critical Length $L_{crit}$

Droplet

PREDICTIVE DEFECT MODEL FOR HIGHLY PRODUCTIVE LASER POWDER BED FUSION ADDITIVE MANUFACTURING

BACKGROUND

The present disclosure relates generally to laser powder bed fusion additive manufacturing and, more particularly, to a method of modeling a laser powder bed fusion additive manufacturing process to determine operating regions that support high productivity operations.

Laser powder bed fusion (LPBF) additive manufacturing is an additive manufacturing, or 3-D printing, technology that uses a laser to sinter or fuse metallic or polymeric particles together in a layer-by-layer process. LPBF is typically used as an industrial process to make near net shape parts. Some LPBF processes sinter the powder particles, while others melt and fuse the powder particles. LPBF is also known as direct metal laser sintering (DMLS).

Similar to other additive manufacturing processes, an operator loads a 3-D CAD file of a desired part into the LPBF machine before the manufacturing process begins. The process usually starts by heating a powder bed to a desired temperature. A laser then scans the powder bed to fuse a first layer of the part. The scanned laser sinters or fuses the powder particles to form a solid shape. The LPBF machine then distributes a new layer of powder over the completed first layer of the part and the laser scans the powder bed to form the next layer of the part on top of the completed first layer of the part. This process continues, layer-by-layer, until the part is completed. A LPBF process like this can produce high quality, defect-free parts, but the time required to make parts, particularly complicated parts, can be very long resulting in low productivity. Accordingly, there have been many efforts to find approaches to increase the rate of production on LPBF machines.

One way to increase the rate of production in a LPBF process is to the increase the speed of the laser scan across the bed. This requires increasing the laser power as well to provide sufficient laser energy input to the powder bed. Increasing scan speed and laser power, however, can create instability in the melt pool and flaws in the parts made with the LPBF process. On large format parts, finding defects after the part is built results in time lost and materials wasted.

SUMMARY

One aspect of this disclosure is directed to a method for modeling additive manufacturing of a part, including the steps of: (i) constructing a model for estimating output of a simulated additive manufacturing process; (ii) entering process operating parameters for an additive manufacturing system into the model to produce an output as a defect status; (iii) comparing the output to acceptance criteria to determine whether the output is acceptable or unacceptable; (iv) determining, based upon the output, regions of operating parameters that support production of the part with acceptable quality characteristics; (v) adding regions of operating parameters that support production of the part with acceptable quality characteristics to a process map for additive manufacturing the part; and (vi) repeating steps (ii) through (v) for different operating parameters until the process map is complete. The model for estimating output of a simulated additive manufacturing process is based upon powder composition, part design, physical properties of a melt pool channel, Bernoulli's equation, energy and mass conservation equations, a laser attenuation coefficient that represents a power loss ratio of the laser to its incident power on a powder bed, wherein the laser attenuation coefficient is a function of recoil pressure, vapor jet velocity and temperature and vapor-driven gas flow. The operating parameters include (1) laser beam spot size, build plate temperature, and layer thickness; (2) temperature-dependent thermophysical properties of the powder; (3) feedstock properties including average powder particle size; and (4) laser hatching strategy including hatch distance, hatch delay time, and stripe width. The output includes: (1) at least one single-track map that includes regions for an unstable melt pool; and (2) at least one single-stripe map that includes regions for vapor-induced lack-of-fusion defects.

Another aspect of this disclosure is directed to a method for additive manufacturing of a part. A part design is entered into an additive manufacturing system programmed with a process map. The process map is developed from a model for estimating output of a simulated additive manufacturing process and operating parameters for the additive manufacturing system. The model is based upon powder composition, part design, physical properties of a melt pool channel, Bernoulli's equation, energy and mass conservation equations, a laser attenuation coefficient that represents a power loss ratio of the laser to its incident power on a powder bed, wherein the laser attenuation coefficient is a function of recoil pressure, vapor jet velocity and temperature and vapor-driven gas flow. The operating parameters include (1) laser beam spot size, build plate temperature, and layer thickness; (2) temperature-dependent thermophysical properties of the powder; (3) feedstock properties including average powder particle size; and (4) laser hatching strategy including hatch distance, hatch delay time, and stripe width. The results is a part produced according to the part design and the process map.

Yet another aspect of this disclosure is directed to a system for additive manufacturing of a part. The additive manufacturing system includes a control unit programmed with a process map, which is developed from a model for estimating output of a simulated additive manufacturing process and process operating parameters. The model is based upon powder composition, part design, physical properties of a melt pool channel, Bernoulli's equation, energy and mass conservation equations, a laser attenuation coefficient that represents a power loss ratio of the laser to its incident power on a powder bed, wherein the laser attenuation coefficient is a function of recoil pressure, vapor jet velocity and temperature and vapor-driven gas flow. The process operating parameters include: (1) additive manufacturing system parameters including laser beam spot size, build plate temperature, and layer thickness; (2) temperature-dependent thermophysical properties of the powder used in the additive manufacturing system; (3) feedstock properties including average powder particle size; and (4) laser hatching strategy including hatch distance, hatch delay time, and stripe width. The part is produced according to the part design and the process map. The control unit is further programmed to operate an additive manufacturing machine at process parameters within the process map.

DETAILED DESCRIPTION

The present disclosure is directed to increasing the rate of production in Laser Powder bed fusion (LPBF) additive manufacturing methods by increasing laser scan speed and laser power to provide sufficient laser energy input to the powder bed. It is known that increasing scan speed and laser power can introduce process complications and create defects in finished parts. At least two mechanisms contribute to creation of defects in the parts. First, the melt pool formed when the high energy laser interacts with the power bed can become unstable due to an elongated and narrow geometry and excessive recoil pressure. Second, the generated spatter and plume can limit the amount of laser energy that reaches the powder bed resulting in formation of lack-of-fusion defects.

Figure 1:
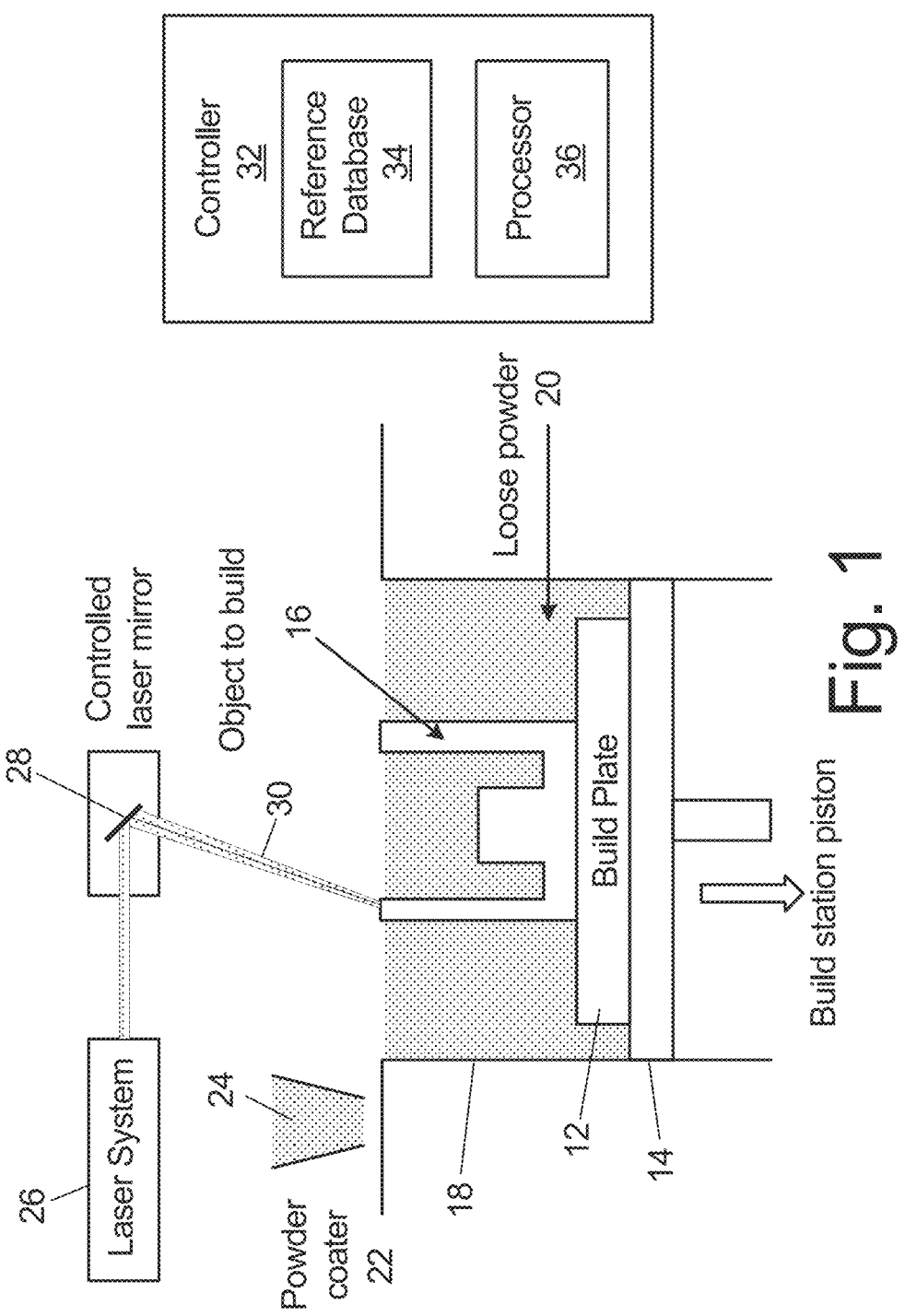
FIG. 1 is a schematic of an exemplary laser powder bed fusion additive manufacturing (LPBF) system.

FIG. 1 is a schematic of an exemplary, non-limiting laser powder bed fusion additive manufacturing (LPBF) system 10. A typical LPBF system 10 includes a build plate 12, a build station piston 14 that adjusts the height of the build plate 12, a workpiece or part 16 that is built on top of the build plate 12, a powder chamber 18 to contain loose, and unconsolidated powder 20 that surrounds the workpiece 16. A typical LPBF system 10 also includes a powder coater 22 that distributes fresh powder 24 over the workpiece 16 after completion of each layer formed on the workpiece 16. A laser system 26 combined with a controlled laser mirror 28 directs a laser beam 30 onto loose powder 20 to form a melt pool (not shown) that, when solidified, forms a layer of the workpiece 16. As each layer of the workpiece 16 is formed, the build station piston 14 lowers the built plate 12 and workpiece 16 by a predetermined distance that corresponds to the desired thickness of the next layer of the workpiece 16. The powder coater 22 then moves across the top of the loose powder 20 to distribute a layer of fresh powder 24 that will then be consolidated by the laser beam 30 to form the next layer of the workpiece 16.

Controller 32 controls the height of the build plate 12 by moving the build station piston 14, which in turn controls the thickness of each layer of the workpiece 16. Controller 32 also controls the movement of the powder coater 22 as it distributes fresh powder 24 and the movement of the laser beam 30 as it forms the melt pool that consolidates loose powder 20 to form each layer of the workpiece 16. For example, the controller 32 controls LPBF system 10 operating parameters, including:

(1) laser beam spot size, build plate temperature, and layer thickness;

(2) temperature-dependent thermophysical properties of the powder;

(3) feedstock properties including average powder particle size; and (4) laser hatching strategy including hatch distance, hatch delay time, and stripe width.

Controller 32 typically includes a reference database 34 and processor 36. Reference database 34 contains processing data relevant to the LPBF system 10, powder to be used to produce the workpiece 16, and the specific work piece 16 to be produced. Processor 36 contains programming to interface with the reference database 34 to control the LPBF system 10 to products parts, such as workpiece 16, as is known to a person of ordinary skill in the art. Workpiece 16 can be a near-net-shaped part (i.e., initial production of the part that is very close to the final (net) shape).

The LPBF system 10 can be used with a variety of powders to produce workpiece 24. For example the powder can be a metal powder or polymeric powder. Metallic powders compatible with typical LPBF systems 10 include aluminum, aluminum alloys (e.g., aluminum-lithium alloys), titanium, nickel, nickel alloys, and other metals and alloys known in the art. Polymeric powders compatible with typical LPBF systems 10 include a wide variety of polymers as known in the art.

The present disclosure is directed to producing a process map that includes models of a process at different process parameters to produce a "virtual machine" that can be used, when loaded into or accessed by reference database 34, to produce physical parts from system 10 with the desired low crack propensity, low residual stress and microstructure properties. The virtual machine can also be used in advance of manufacture of actual parts to model virtual parts and estimate results at intended process parameters.

Characteristics of a resulting part or workpiece 16 from an additive manufacturing process can be accurately simulated and predicted. Up to now, however, there has not been an analytical physics-based modeling tool to predict defect formation and melt pool instability in the high-speed and high-power operating regime. This application discloses a comprehensive analysis tool to identify regions of allowable laser scan speeds and powers to increase rate of production without introducing melt pool instability and flaws into the parts produced by LPBF methods. This physics-based model has the following advantages over conventional models based on finite element, CFD or multiple layer averaging:

Ability to calculate process maps for single & multi hatch scans in a short amount of time (seconds)

Ability to calculate process maps from physics-based understanding rather than semi empirical correlations In one embodiment the physics-based model of this disclosure is implemented in MATLAB, a programming and numeric computing platform available from The Math Works, Inc. As well known, the MATLAB platform is useful for analyzing data, developing algorithms, and creating models. Creating the physics-based model of this disclosure in MATLAB or on another computer-based platform, permits the model to predict lack-of-fusion flaw formation and melt pool instability in high-power and high-speed operating regimes that are desired for LPBF system 10 to improve productivity. The inputs to the model are: (1) LPBF system 10 parameters including laser beam spot size, build plate temperature, and layer thickness; (2) temperature-dependent thermophysical properties of the powder used in the LPBF system 10; (3) feedstock properties including average powder particle size; and (4) laser hatching strategy including hatch distance, hatch delay time, and stripe width. The outputs from the model include single-track maps that indicate regions for unstable melt pool and single-stripe maps that indicate regions for vapor-induced lack-of-fusion defects.

This defect analysis tool disclosed enables quick identification of operating regions where melt pool instability and flaw formation in additively manufactured parts will occur. As such, the tool also identifies operating regions where melt pool instability and flaw formation in additively manufactured parts do not occur. It is based on multi scale physics-based models that incorporate analytical equations at micro and meso levels and numerical calculations at part level. The analytical equations represent the underlying physics for predicting melt pool and defect characteristics. The numerical calculations at part level provide the capability to predict melt pool and defect characteristics as a function of location in the part.

Melt Pool Instability

Figure 2B:
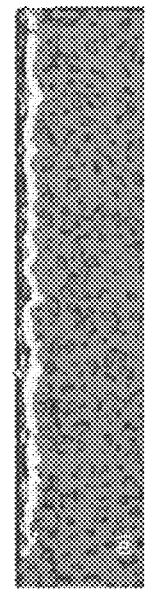
FIG. 2B is a side view of a FLOW-3D model of an unstable melt pool in a LPBF system similar to one depicted in FIG. 1.
Figure 2A:
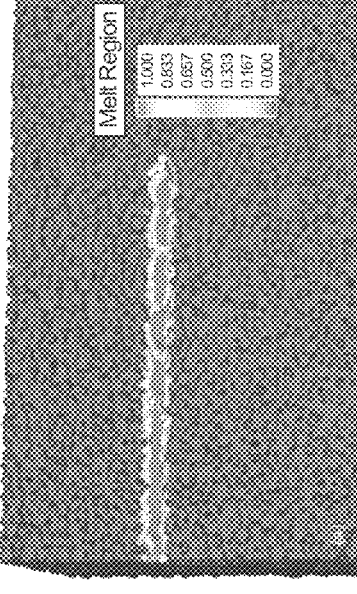
FIG. 2A is an overhead view of a FLOW-3D model of an unstable melt pool in a LPBF system similar to one depicted in FIG. 1.
Figure 2D:
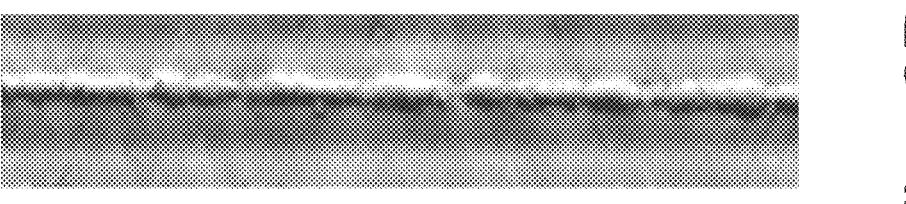
FIG. 2D is a single track exhibiting periodic occurrence of humps and valleys due to melt pool instability in a LPBF system similar to one depicted in FIG. 1.
Figure 2C:
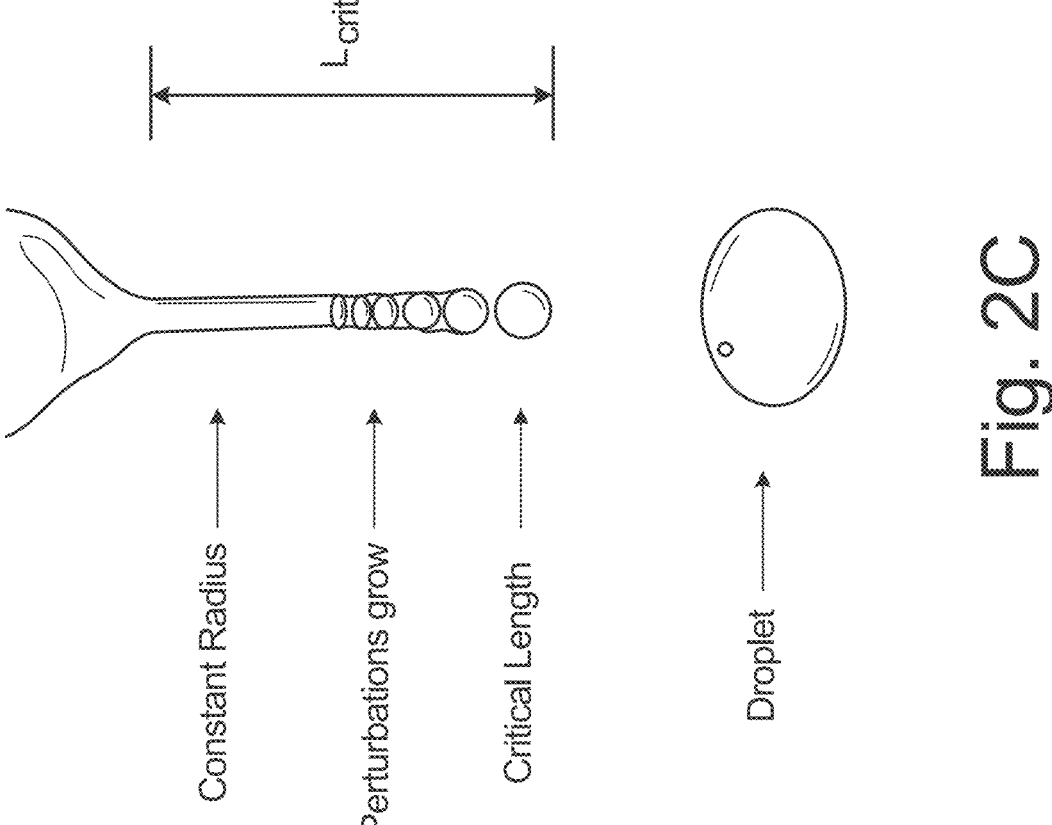
FIG. 2C depicts instability in a falling liquid jet resulting in formation of a droplet.

Melt pool instability is one of the limiting factors to increasing rate of production using higher scan speeds and laser power in LPBF system 10. FIGS. 2A and 2B depicts a model of an unstable melt pool simulated using FLOW-3D AM (CFD software for simulating LPBF systems, available from Flow Science, Inc.), which exhibits periodic perturbations in the stream. Instability in the melt pool resembles perturbations in a falling liquid jet, which could result in breaking the flow into a stream of droplets at a critical length as illustrated in FIG. 2C. The instability depicted in FIG. 2C and observed in unstable melt pools is governed by Plateau-Rayleigh criteria. An unstable melt pool manifests itself in periodic occurrence of humps and valleys in the solidified track, which makes the deposited material prone to formation of undesirable pores. FIG. 2D shows a single-track exhibiting periodic occurrence of humps and valleys due to melt pool instability. The goal of using the model disclosed in this application is to predict operating regions that will permit high-power and high-speed operation of LPBF systems without formation of the undesirable pores, humps, and valleys.

Figure 3:
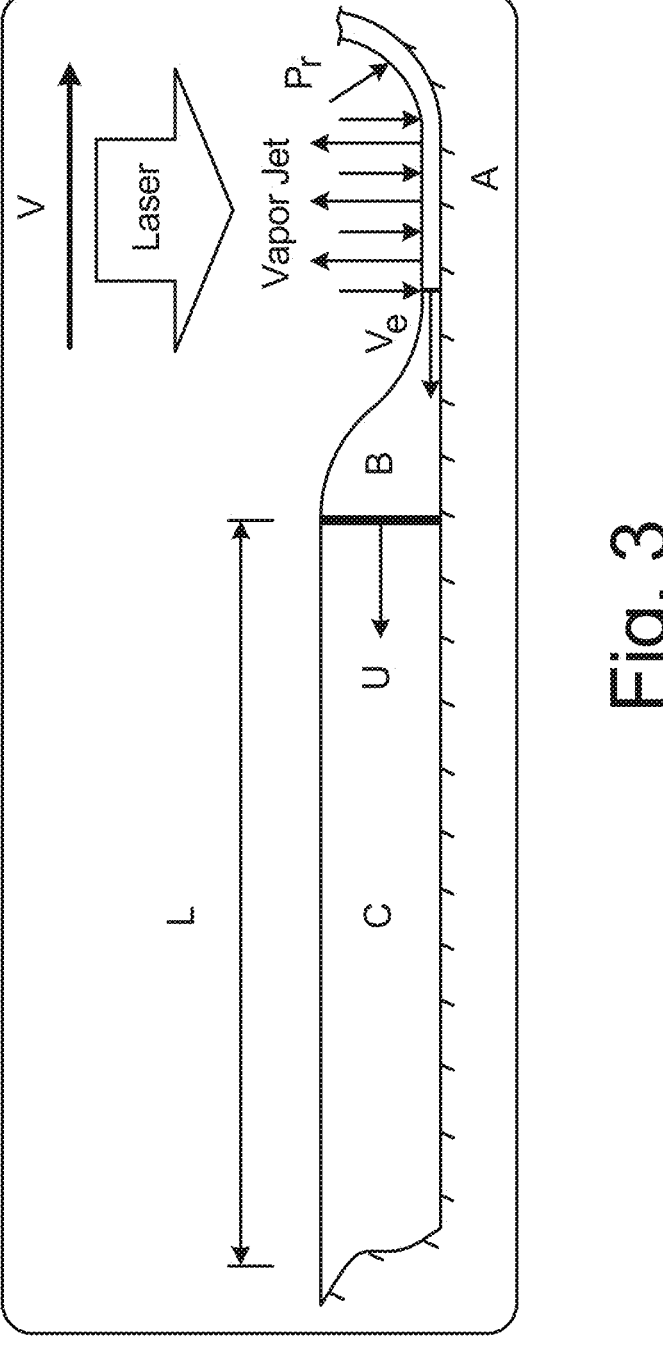
FIG. 3 is a schematic of longitudinal cross section of a LPBF system melt pool operating at high-power and high-speed laser regime.

FIG. 3 depicts a schematic of a longitudinal cross section of a LPBF system 10 melt pool operating at a high-power and high-speed laser scanning regime. In this FIG. 3, $P_r$ is the recoil pressure in the melt poot, $V_e$ is melt pool ejection velocity, U is backward flow velocity in the melt pool channel, L is the length of the melt pool channel, R is the radius of the melt pool channel, and V is the laser scan speed. As shown in FIG. 3, a melt pool in the high-power and high-speed laser scanning regime includes three regions:

Region A: a keyhole depression under the laser where the melt pool is ejected backward due to the recoil pressure $P_r$ Region B: a transition zone in which the flow of melted powder moves backward due to inertia and upward due to surface tension Region C: a long channel of melt pool flowing backward that resembles a moving liquid jet FIG. 3 shows that the high-power laser can cause significant recoil pressure $P_r$ on the melt pool surface resulting in backward flow of the liquid (i.e., melted powder). The high-speed laser scanning can create long and narrow melt pools susceptible to Plateau-Rayleigh instability, which occurs when a falling stream of fluid breaks up into smaller packets with the same volume but less surface area. The driving force of the Plateau-Rayleigh instability is that liquids, by virtue of their surface tensions, tend to minimize their surface area. Instability happens in the melt pool when its length reaches the critical value determined by the Plateau-Rayleigh instability equation.

Physics-based analytical equations have been developed to compute the physical properties of the melt pool channel that are required for Plateau-Rayleigh instability calculation. These include the length L of the melt pool channel and backward flow velocity U in the melt pool channel (See FIG. 3), which are all expressed as functions of laser power and scan speed. Some underlying physics that are used for model development includes Bernoulli's equation and energy, mass, and momentum conservation equations.

Figures 4A, 4B:
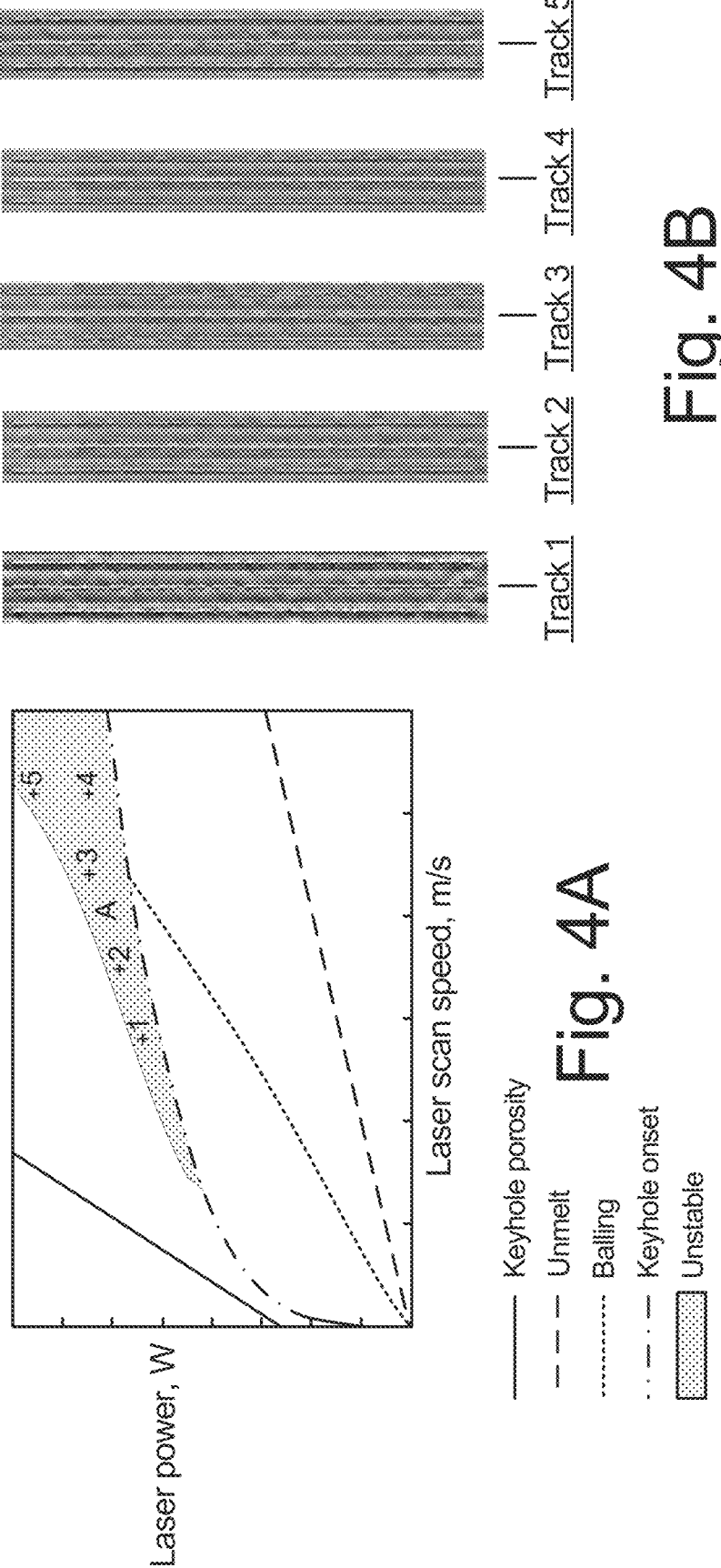
FIG. 4A is a single track map generated by the model of the present disclosure that includes a region for an unstable melt pool and five experimental data points used for model validation.
FIG. 4B are single tracks used for experimental validation of the single track map depicted in FIG. 4A.

FIG. 4A shows an example of a single-track map generated by the model of this application that includes a region A for an unstable melt pool. The predicted single-track map of FIG. 4A was validated against experimental measurements of single tracks, Tracks 1-5, as shown in FIG. 4B.

In the some cases, the instability of the melt pool results in formation of droplets, which is equivalent to balling. Balling refers to the creation of spherical, or approximately spherical shapes within the structure of the part. The balling flaw corresponds to an expected amount of balling within the resultant part.

Vapor-Induced Lack-of-Fusion Defects

Figure 5:
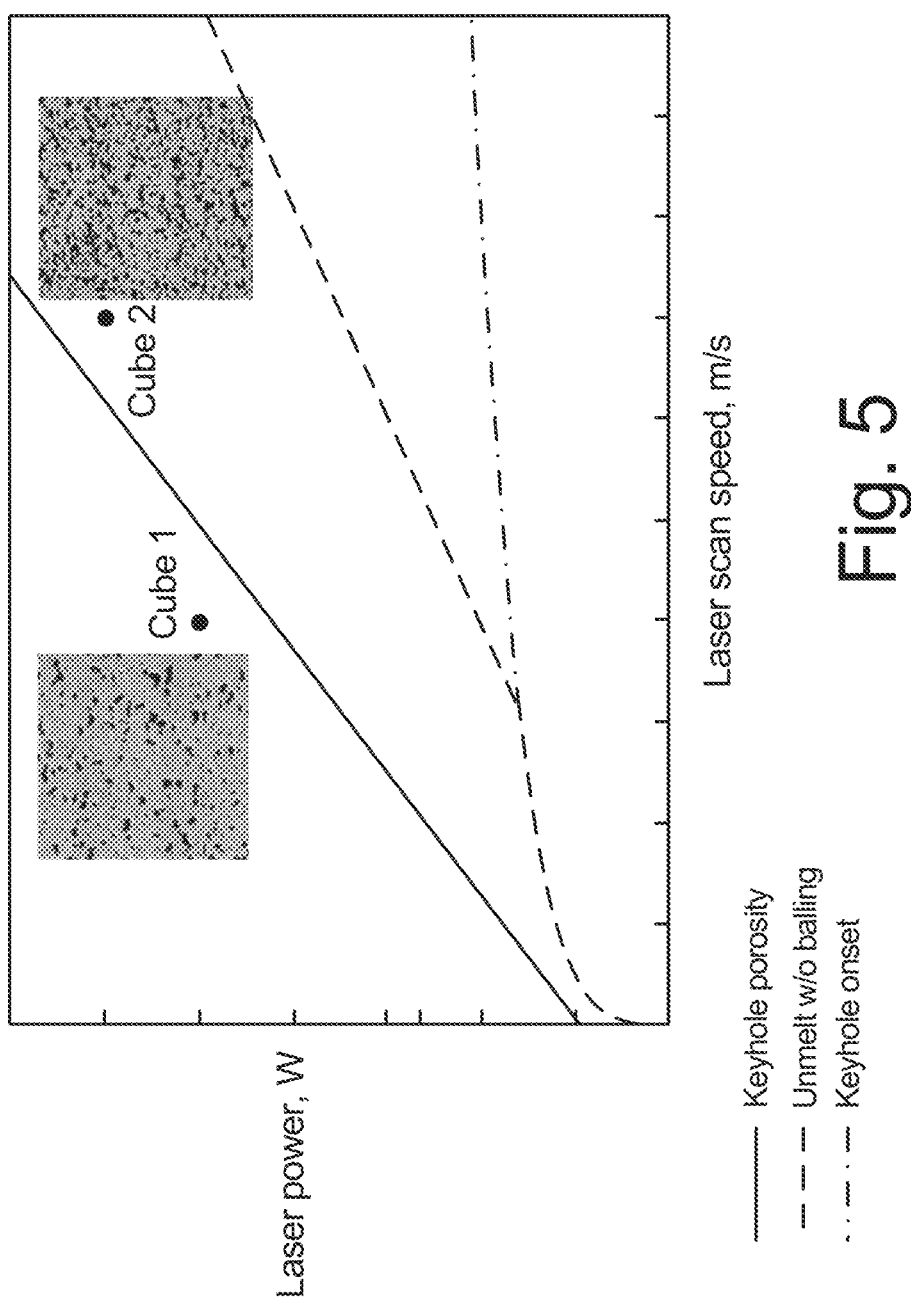
FIG. 5 is a single track map overlaid with material characterization of cubes printed with high laser power and high scan speed that shows lack-of-fusion type porosities.

Formation of spatter- and plume-related lack-of-fusion defects is another limiting factor to increasing rate of production using higher scan speed and laser power in LPBF systems. Material characterization of cubes printed with high laser power and high scan speeds revealed lack-of-fusion type porosities. FIG. 5 shows two examples of such cubes that display lack-of-fusion type porosities resulting from high laser power and high scan speeds. As shown in FIG. 5, one might expect keyhole defects in these cubes as the process parameters are located within or near the keyhole porosity region. Lack-of-fusion defects in the high-power and high-speed operating regime may be due to the presence of vapor-induced phenomena such as spatter and laser-plume interaction.

Figures 6A, 6B:
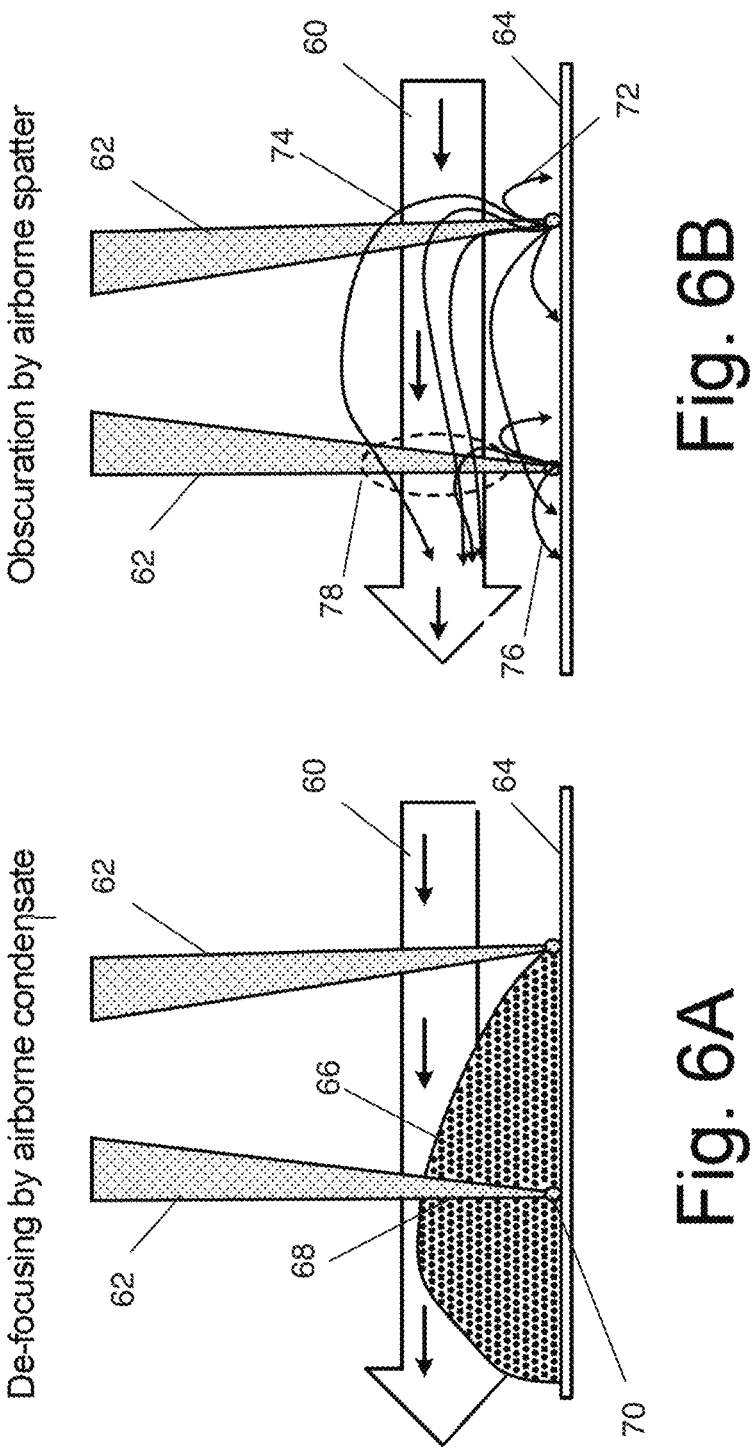
FIG. 6A depicts one type of vapor-induced phenomenon, de-focusing by airborne condensate.
FIG. 6B depicts another type of vapor-induced phenomenon, obscuration by airborne spatter.

The amount of laser energy delivered to the powder bed is reduced by plume and spatter in two ways: (1) de-focusing by airborne condensate, leading to reduced laser spot intensity, (2) obscuration by airborne spatter and condensate, preventing the full laser energy reaching the bed. FIGS. 6A and 6B show schematics of these two phenomena. In addition, landing spatters could increase the layer thickness locally, resulting in lack-of-fusion defects.

The model disclosed in this application can predict formation of spatter- and plume-related lack-of-fusion defects in the high-power and high-speed operating regime in LPBF systems. A new region is introduced in the single stripe process map to represent the process parameters associated with this type of defects, as shown in FIGS. 6A and 6B, that limit the amount of laser energy reaching the powder bed. FIG. 6A depicts de-focusing by airborne condensate as gas flow 60 passes over the surface 64 of the melt pool as laser beams 62 heat the surface 64, causing condensate to billow up 66, causing the downwind laser beam to pass through condensate 68 which results in reduced spot intensity 70. FIG. 6B depicts obscuration by airborne spatter in which upwind spatter 72 results in spatter 74 being transported by the gas flow, which in turn results in the laser beam being obscured 78 as it passes through the spatter 74. Local spatter 76 can also occur to obscure the laser beam further. The model relies on using a laser attenuation coefficient to represent the effect of vapor-induced phenomena on the amount of laser energy reaching the powder bed. This coefficient is defined as the power loss ratio of the laser to its incident power, and is related to vapor-related quantities such as recoil pressure, vapor jet velocity and temperature and vapor-driven gas flow.

Figure 7:
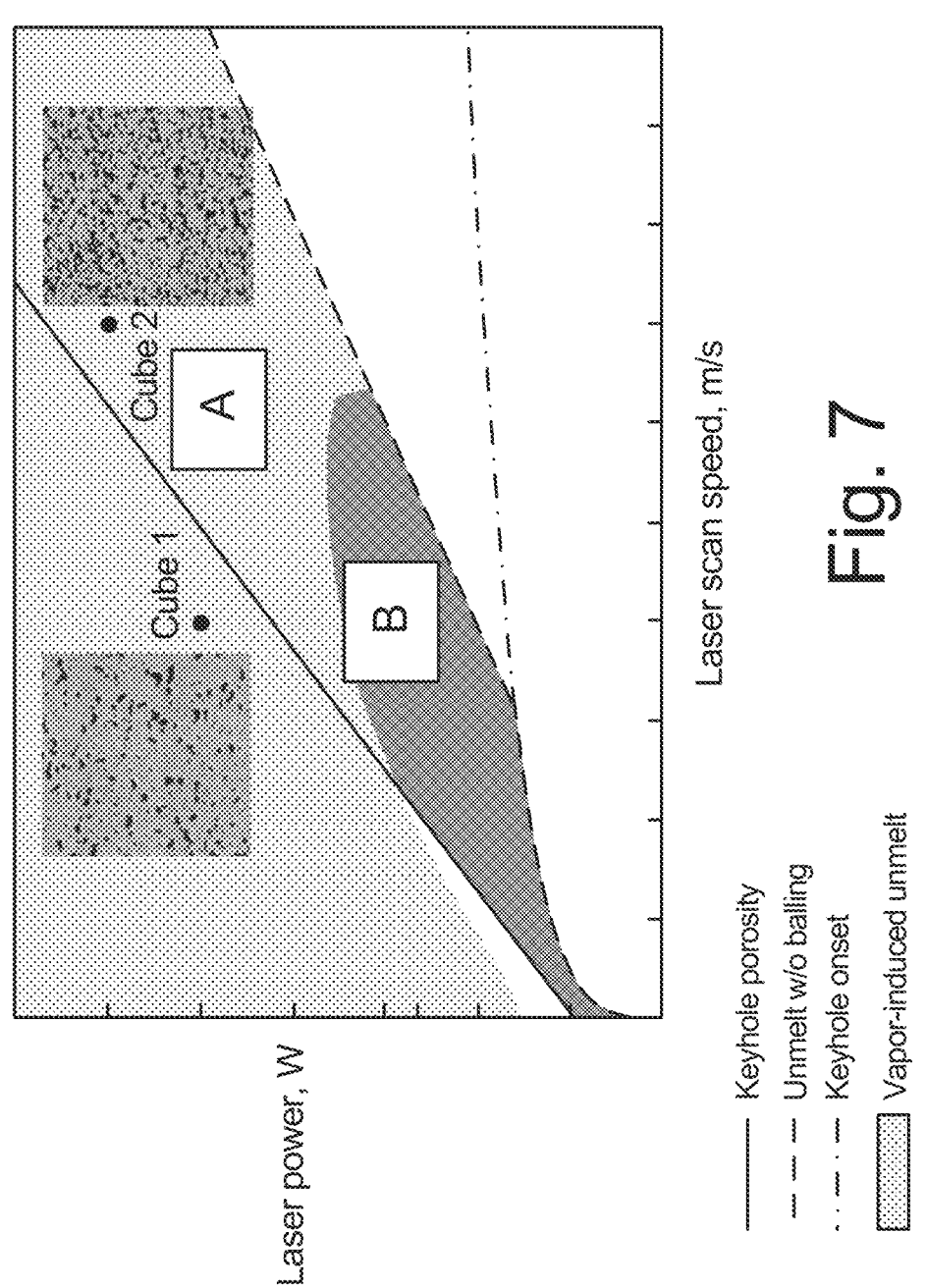
FIG. 7 is a single stripe map overlaid that shows a region where acceptable parts can be produced.

Ultimately, the model can be used to predict regions of stable operation that can be translated in to operating parameters for the LPBF system 10. FIG. 7 shows two regions overlaid on the single stripe map of FIG. 5: a region A of unstable operation caused by vapor-induced unmelt and a region B of stable operation where vapor-induced unmelt is not a factor and acceptable parts can be produced.

The model disclosed in this application combines the impact of melt pool instability and vapor-induced lack-of-fusion defects into a single model for estimating output of a simulated additive manufacturing process based upon powder composition. As such, the model is based upon part design, physical properties of a melt pool channel, Bernoulli's equation, energy and mass conservation equations, a laser attenuation coefficient that represents a power loss ratio of the laser to its incident power on a powder bed, wherein the laser attenuation coefficient is a function of recoil pressure, vapor jet velocity and temperature and vapor-driven gas flow.

After the model is compiled, process operating parameters for the additive manufacturing system are entered into the model to produce an output. The operating parameters include: (1) laser beam spot size, build plate temperature, and layer thickness; (2) temperature-dependent thermophysical properties of the powder; (3) feedstock properties including average powder particle size; and (4) laser hatching strategy including hatch distance, hatch delay time, and stripe width.

The model then generates output as a defect status that is compared to acceptance criteria to determine whether the output is acceptable or unacceptable. The acceptance criteria can include any criteria used to determine if the part will meet the requirements of the environment in which it is intended for use, such as acceptable quality characteristics. For example, the acceptance criteria can include at least one of residual stress, microstructure, porosity, crack propensity of the part. Other acceptance criteria can be used depending on the part and the environment in which it is intended for use.

Based on the comparison of the output to the acceptance criteria, regions of operating parameters that support production of the part with acceptable quality characteristics are determined. The regions of operating parameters that support production of the part with acceptable quality characteristics are added to a process map for additive manufacturing the part. This process is then repeated for different operating parameters until the process map is complete. The process map consists of at least one single-track map that includes regions for an unstable melt pool; and at least one single-stripe map that includes regions for vapor-induced lack-of-fusion defects.

Optionally, the process map can be loaded into a physical LPBF system to produce a physical part. Once made, the physical part can be validated against the acceptance criteria and the process model can be calibrated upon characteristics of the physical part.

Depending on the controller for a particular LPBF system and any other factors that a user deems appropriate, unacceptable output, i.e., output that does not meet the acceptance criteria, may or may not be added to the process map. Including unacceptable output in the process map can provide more complete instructions for the LPBF system, but such additional information is not always necessary to product parts with acceptable quality characteristics. One factor that can determine whether or not unacceptable output should be added to the process map is the amount of memory available to the LPBF system processor.

The disclosed method identifies an acceptable processing region that allows for laser scan speeds and power levels to increase rate of production without introducing melt pool instability and flaws into the part. This fast-acting analysis tool can reduce the costly and time consuming trial and error practices that are currently used for qualifying parts made on LPBF systems like LPBF system 10. The information obtained from this predictive model disclosed can be used to make high quality parts with additive manufacturing processes, which in turn reduces the need for post-build operations in the production process chain.

Discussion of Possible Embodiments

The following are non-exclusive descriptions of possible embodiments of the present invention.

A method for modeling additive manufacturing of a part, comprising the steps of: (i) constructing a model for estimating output of a simulated additive manufacturing process; (ii) entering process operating parameters for an additive manufacturing system into the model to produce an output as a defect status; (iii) comparing the output to acceptance criteria to determine whether the output is acceptable or unacceptable; (iv) determining, based upon the output, regions of operating parameters that support production of the part with acceptable quality characteristics; (v) adding regions of operating parameters that support production of the part with acceptable quality characteristics to a process map for additive manufacturing the part; and (vi) repeating steps (ii) through (v) for different operating parameters until the process map is complete. The model for estimating output of a simulated additive manufacturing process is based upon powder composition, part design, physical properties of a melt pool channel, Bernoulli's equation, energy and mass conservation equations, a laser attenuation coefficient that represents a power loss ratio of the laser to its incident power on a powder bed, wherein the laser attenuation coefficient is a function of recoil pressure, vapor jet velocity and temperature and vapor-driven gas flow. The operating parameters include: (1) laser beam spot size, build plate temperature, and layer thickness; (2) temperature-dependent thermophysical properties of the powder; (3) feedstock properties including average powder particle size; and (4) laser hatching strategy including hatch distance, hatch delay time, and stripe width. The complete process map includes: (1) at least one single-track map that indicates regions for an unstable melt pool; and (2) at least one single-stripe map that indicates regions for vapor-induced lack-of-fusion defects.

The method for modeling additive manufacturing of a part of the preceding paragraph can optionally include, additionally and/or alternatively, any one or more of the following features, configurations and/or additional elements:

A further embodiment of the foregoing method for modeling additive manufacturing of a part, wherein the acceptable quality characteristics include at least one of residual stress, microstructure, porosity, crack propensity of the part.

A further embodiment of any of the foregoing methods for modeling additive manufacturing of a part, wherein the part is a complex near-net-shaped part.

A further embodiment of any of the foregoing methods for modeling additive manufacturing of a part, wherein the physical properties of a melt pool channel are computed based a radius and length of the melt pool channel and backward flow velocity in the melt pool channel, wherein the radius, length and backward flow velocity of the melt pool channel are expressed as functions of laser power and scan speed.

A further embodiment of any of the foregoing methods for modeling additive manufacturing of a part, further comprising using the process map to produce a physical part on a powder bed fusion additive manufacturing (LPBF) system.

A further embodiment of any of the foregoing methods for modeling additive manufacturing of a part, further comprising validating and calibrating the process model based upon characteristics of the physical part.

A further embodiment of any of the foregoing methods for modeling additive manufacturing of a part, wherein unacceptable output is not added to the process map.

A further embodiment of any of the foregoing methods for modeling additive manufacturing of a part, wherein unacceptable output is added to the process map to set boundaries related to unacceptable parts.

A further embodiment of any of the foregoing methods for modeling additive manufacturing of a part, wherein the operating parameters comprise laser power and laser scan speed.

A further embodiment of any of the foregoing methods for modeling additive manufacturing of a part, wherein the part is produced from an alloy.

A method for additive manufacturing of a part, comprising entering a part design into an additive manufacturing system programmed with a process map to produce a part according to the part design and the process map. The process map is developed from: a model for estimating output of a simulated additive manufacturing process based upon powder composition, part design, physical properties of a melt pool channel, Bernoulli's equation, energy and mass conservation equations, a laser attenuation coefficient that represents a power loss ratio of the laser to its incident power on a powder bed, wherein the laser attenuation coefficient is a function of recoil pressure, vapor jet velocity and temperature and vapor-driven gas flow; and operating parameters for the additive manufacturing system. The operating parameters for the additive manufacturing system include: (1) laser beam spot size, build plate temperature, and layer thickness; (2) temperature-dependent thermophysical properties of the powder; (3) feedstock properties including average powder particle size; and (4) laser hatching strategy including hatch distance, hatch delay time, and stripe width.

A further embodiment of the foregoing method for additive manufacturing of a part, wherein the part is a complex near-net-shaped part.

A further embodiment of any of the foregoing methods for additive manufacturing of a part, wherein the part is produced from an alloy.

A further embodiment of any of the foregoing methods for additive manufacturing of a part, wherein the process map defines regions of additive manufacturing system operating parameters that produce parts with acceptable quality characteristics.

A further embodiment of any of the foregoing methods for additive manufacturing of a part, wherein the operating parameters comprise laser power and laser scan speed.

A system for additive manufacturing of a part, comprising an additive manufacturing system comprising a control unit programmed with a process map to produce a part according to the part design and the process map, wherein the control unit is further programmed to operate an additive manufacturing machine at process parameters within the process map. The process map is developed from: (i) a model for estimating output of a simulated additive manufacturing process based upon powder composition, part design, physical properties of a melt pool channel, Bernoulli's equation, energy and mass conservation equations, a laser attenuation coefficient that represents a power loss ratio of the laser to its incident power on a powder bed, wherein the laser attenuation coefficient is a function of recoil pressure, vapor jet velocity and temperature and vapor-driven gas flow; and (ii) process operating parameters. The process operating parameters include: (1) additive manufacturing system parameters including laser beam spot size, build plate temperature, and layer thickness; (2) temperature-dependent thermophysical properties of the powder used in the additive manufacturing system; (3) feedstock properties including average powder particle size; and (4) laser hatching strategy including hatch distance, hatch delay time, and stripe width.

A further embodiment of the foregoing system for additive manufacturing of a part, wherein the part is a complex near-net-shaped part.

A further embodiment of any of the foregoing systems for additive manufacturing of a part, wherein the part is produced from an alloy.

A further embodiment of any of the foregoing systems for additive manufacturing of a part, wherein the process map defines regions of additive manufacturing system operating parameters that produce parts with acceptable quality characteristics.

A further embodiment of any of the foregoing systems for additive manufacturing of a part, wherein the operating parameters comprise laser power and laser scan speed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for modeling additive manufacturing of a part, comprising the steps of:
   (i) constructing a model for estimating output of a simulated additive manufacturing process based upon powder composition, part design, physical properties of a melt pool channel, Bernoulli's equation, energy and mass conservation equations, a laser attenuation coefficient that represents a power loss ratio of the laser to its incident power on a powder bed, wherein the laser attenuation coefficient is a function of recoil pressure, vapor jet velocity and temperature and vapor-driven gas flow;

(ii) entering process operating parameters for an additive manufacturing system into the model to produce an output as a defect status, wherein the operating parameters include:

(1) laser beam spot size, build plate temperature, and layer thickness;

(2) temperature-dependent thermophysical properties of the powder;

(3) feedstock properties including average powder particle size; and (4) laser hatching strategy including hatch distance, hatch delay time, and stripe width;

(iii) comparing the output to acceptance criteria to determine whether the output is acceptable or unacceptable;

(iv) determining, based upon the output, regions of operating parameters that support production of the part with acceptable quality characteristics;

(v) adding regions of operating parameters that support production of the part with acceptable quality characteristics to a process map for additive manufacturing the part; and (vi) repeating steps (ii) through (v) for different operating parameters until the process map is complete, wherein the complete process map includes:

(1) at least one single-track map that indicates regions for an unstable melt pool; and (2) at least one single-stripe map that indicates regions for vapor-induced lack-of-fusion defects.

2. The method of claim 1, wherein the acceptable quality characteristics include at least one of residual stress, microstructure, porosity, crack propensity of the part.

3. The method of claim 1, wherein the part is a complex near-net-shaped part.

4. The method of claim 1, wherein the physical properties of a melt pool channel are computed based a radius and length of the melt pool channel and backward flow velocity in the melt pool channel, wherein the radius, length and backward flow velocity of the melt pool channel are expressed as functions of laser power and scan speed.

5. The method of claim 1, further comprising using the process map to produce a physical part on a powder bed fusion additive manufacturing (LPBF) system.

6. The process of claim 5, further comprising validating and calibrating the process model based upon characteristics of the physical part.

7. The method of claim 1, wherein unacceptable output is not added to the process map.

8. The method of claim 1, wherein unacceptable output is added to the process map to set boundaries related to unacceptable parts.

9. The method of claim 1, wherein the operating parameters comprise laser power and laser scan speed.

10. The method of claim 1, wherein the part is produced from an alloy.

11. A method for additive manufacturing of a part, comprising entering a part design into an additive manufacturing system programmed with a process map developed from the method of claim 1 and producing a part according to the part design and the process map.

12. The method of claim 11, wherein the part is a complex near-net-shaped part.

13. The method of claim 11, wherein the part is produced from an alloy.

14. The method of claim 11, wherein the process map defines regions of additive manufacturing system operating parameters that produce parts with acceptable quality characteristics.

15. The method of claim 14, wherein the operating parameters comprise laser power and laser scan speed.

16. A system for additive manufacturing of a part, comprising an additive manufacturing system comprising a control unit programmed with a process map developed from the method of claim 1 wherein the control unit is further programmed to operate an additive manufacturing machine at process parameters within the process map.

17. The system of claim 16, wherein the part is a complex near-net-shaped part.

18. The system of claim 16, wherein the part is produced from an alloy.

19. The system of claim 16, wherein the process map defines regions of additive manufacturing system operating parameters that produce parts with acceptable quality characteristics.

20. The system of claim 19, wherein the operating parameters comprise laser power and laser scan speed.

* * * * *